(12) United States Patent
Tonissen et al.

(10) Patent No.: US 6,295,326 B1
(45) Date of Patent: Sep. 25, 2001

(54) KALMAN FILTER BASED EQUALIZATION FOR DIGITAL MULTICARRIER COMMUNICATIONS SYSTEMS

(75) Inventors: Shane Michael Tonissen; Efstratios Skafidas, both of Victoria (AU); Andrew Logothetis, Uppsala (SE)

(73) Assignee: Bandspeed, Inc., Austin, TX (US)

( * ) Notice: Subject to any disclaimer, the term of this patent is extended or adjusted under 35 U.S.C. 154(b) by 0 days.

(21) Appl. No.: 09/516,715

(22) Filed: Mar. 1, 2000

Related U.S. Application Data (60) Provisional application No. 60/123,348, filed on Mar. 8, 1999.

(51) Int. Cl.$^7$ .................. H04B 1/10; H03H 5/10
(52) U.S. Cl. .......................... 375/350; 333/28 R
(58) Field of Search .................. 375/350, 229, 375/232; 333/28 R; 705/323, 322

(56) References Cited

U.S. PATENT DOCUMENTS

| | | | |
|---|---|---|---|
| 5,068,873 | * 11/1991 | Murakami | 375/231 |
| 5,111,481 | * 5/1992 | Chen et al. | 375/232 |
| 5,432,816 | * 7/1995 | Gozzo | 375/232 |
| 5,432,821 | 7/1995 | Polydoros et al. | 375/340 |
| 5,715,280 | * 2/1998 | Sandberg et al. | 375/260 |

FOREIGN PATENT DOCUMENTS

| | | |
|---|---|---|
| 0 795 985 A2 | 9/1997 | (EP) . |
| 0 912 023 A1 | 4/1999 | (EP) . |
| WO 97/40587 | 10/1997 | (WO) . |
| WO 98/59450 | 12/1998 | (WO) . |

OTHER PUBLICATIONS

Van Bladel, Mark and Moeneclaey, Marc, "Time–domain Equalization for Multicarrier Communication," IEEE Global Telecommunications Conference, Nov. 14, 1995, pp. 167–171.

Lashkarian, Navid and Kiaei, Sayfe, "Fast Algorithm for Finite–Length MMSE Equalizers with Application to Discrete Multitone Systems," IEEE International Confernece on Acoustics, Speech, and Signal Processing, Mar. 15, 1999, pp. 2753–2756.

\* cited by examiner

*Primary Examiner*—Chi Pham
*Assistant Examiner*—Khai Tran
(74) *Attorney, Agent, or Firm*—Hickman Palermo Truong & Becker LLP; Edward A. Becker (57) ABSTRACT

A computer-implemented approach for reducing distortion in digital communications systems generally involves obtaining an optimal estimation of the original data using a Kalman filter with an increased length state to remove substantially all ISI in the time domain. The use of an increased length state in the Kalman filter provides a more accurate estimate of the transmitted data with relatively little additional computational cost. Subsequent equalization may also be performed in the frequency domain to correct any residual amplitude and phase distortion.

23 Claims, 6 Drawing Sheets

Fig. 6

KALMAN FILTER BASED EQUALIZATION FOR DIGITAL MULTICARRIER COMMUNICATIONS SYSTEMS

RELATED APPLICATIONS

This application is related to U.S. Provisional Application No. 60/123,348, entitled "KALMAN FILTER BASED EQUALIZATION FOR HIGH SPEED DIGITAL COMMUNICATION CHANNELS," filed Mar., 8, 1999 by SHANE MICHAEL TONISSEN, EFSTRATIOS SKAFIDAS and ANDREW LOGOTHETIS, the contents of which are incorporated herein by reference for all purposes.

FIELD OF THE INVENTION

The present invention relates to digital communications systems, and more specifically, to an approach for removing distortion in multi carrier digital communications systems such as Discrete Multi Tone (DMT) and Orthogonal Frequency Division Multiplexing (OFDM) systems.

BACKGROUND OF THE INVENTION

Figure 1:
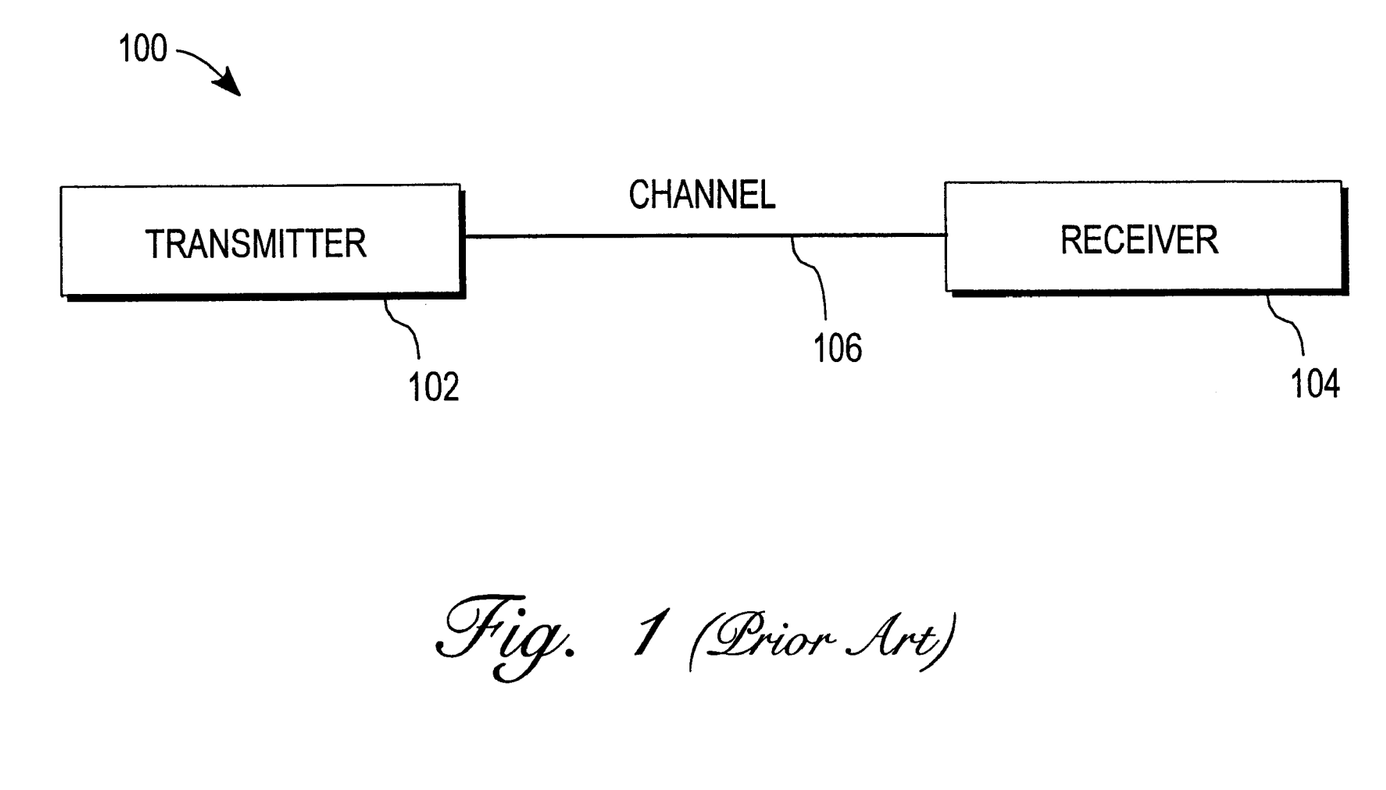
FIG. 1 is a block diagram of a conventional digital communications system.

One of the most important concerns in digital communications systems is minimizing distortion introduced by a communications channel, sometimes referred to as "channel effects." FIG. 1 is a block diagram 100 of a conventional digital communications system. Data is transmitted from a transmitter 102 to a receiver 104 over a communications channel ("channel") 106. Channel 106 may be any type of communication medium for transferring data between transmitter 102 and receiver 104. For example, channel 106 may be one or more network connections, wires, fiber-optic links or a wireless digital communications link.

Ideally, data is transmitted between transmitter 102 and receiver 104 over channel 106 without being distorted. That is, the data retrieved by receiver 104 from channel 106 is identical to the data placed onto channel 106 by transmitter. However, in practice, channel 106 introduces distortion that can corrupt data transmitted over channel 106. The distortion introduced by channel 106 can cause successive transmitted symbols to interfere with each other, otherwise known as inter-symbol interference (ISI). ISI can cause severe corruption of digital data, resulting in a very high bit error rate (BER). The corruption of data occurs while being transmitted across communications channel 106. In multicarrier systems ISI must be removed before transformation of time domain data to frequency domain data, e.g., via a fast Fourier transform (FFT), which causes ISI to be spread across all frequency bins, producing significant signal to noise degradation. The common solution to this problem is to remove ISI from the sampled data using time domain equalization (TDEQ) before transforming the sampled data from the time domain data to the frequency domain. This allows the original data to be recovered from the communications channel.

Figure 2:
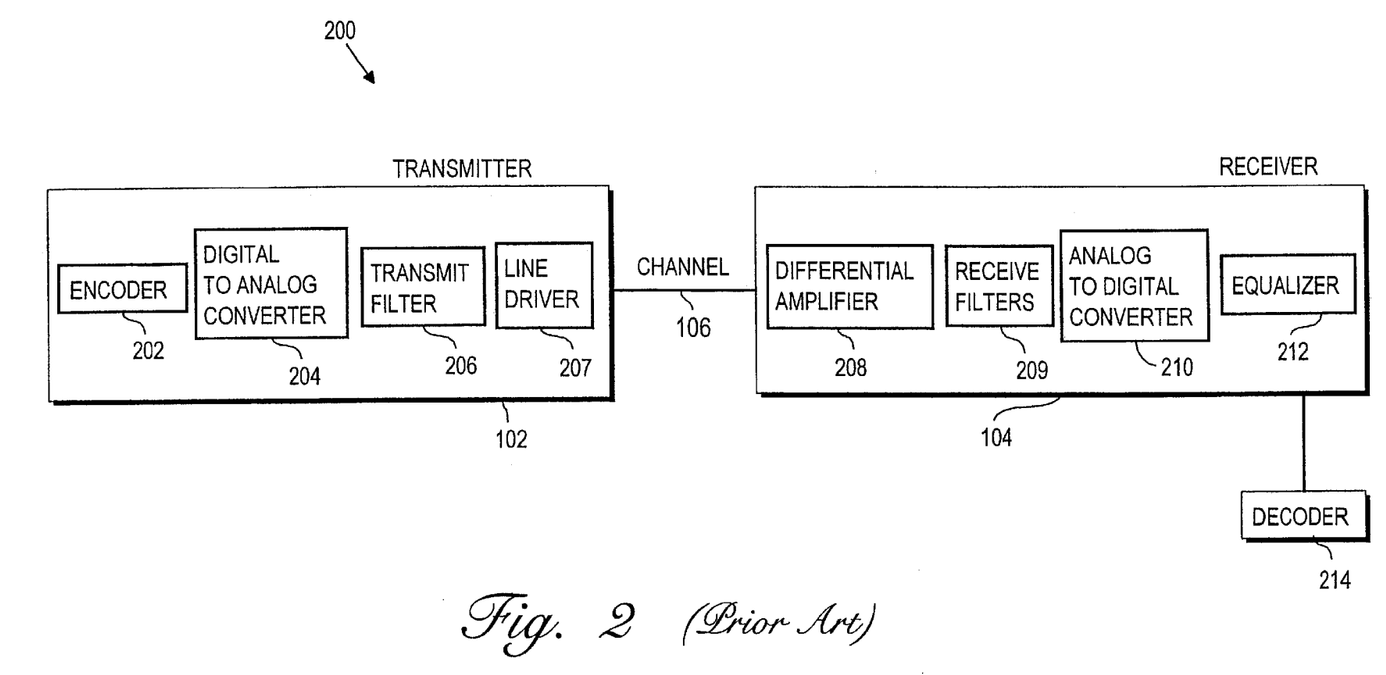
FIG. 2 is a block diagram illustrating example implementations of the transmitter and receiver illustrated in FIG. 1.

FIG. 2 is a block diagram 200 illustrating an example implementation of transmitter 102 and receiver 104 of FIG. 1. Transmitter 102 typically includes an encoder 202, a digital-to-analog converter 204 and a transmit filter 206 and a line driver 207. Encoder 202 encodes the original digital data to generate encoded digital data. The encoded digital data is converted to analog encoded data by digital-to-analog converter 204. Transmit filter 206 removes unwanted components of the original data from the encoded analog data to generate filtered data. Line driver 207 amplifies the signal to transmit the signal across channel 106. The filtered data is transmitted over channel 106 to receiver 104.

Receiver 104 includes a differential amplifier 208, one or more receive filters 209, an analog-to-digital converter 210 and an equalizer 212. After data is received by receiver 104 from channel 106, receive filter 209 removes unwanted components from the encoded analog data received from transmitter 102 over channel 106. Analog-to-digital converter 210 converts the encoded analog data received from transmitter 102 to encoded digital data. Equalizer 212 processes the encoded digital data to remove ISI. The encoded digital data is further processed by converting the data to the frequency domain via a Fast Fourier Transform to recover the modulated tones. Residual frequency domain equalization is performed in the frequency domain before the data is transferred to a decoder 214 that recovers the original digital data. Decoder 214 may be separate from receiver 104 as illustrated, or may be incorporated into receiver 104.

Most conventional approaches for removing ISI have significant limitations that result in degraded performance. Many of the limitations in conventional approaches are attributable to the nature of ISI and the nature of other external noise sources. Conventional approaches address each problem as independent, i.e., ISI removal and noise mitigation. Thus, solving one problem can exacerbate the effects of another. For example, some TDEQ mechanisms do not account for noise sources such as thermal noise and crosstalk. In addition, the characteristics (transfer function) of a communications channel are not necessarily static and can change over time. As a result, conventional TDEQ mechanisms suffer from a number of drawbacks generally including not removing all of the channel-induced ISI or having stability problems. For example, decision feedback TDEQ mechanisms can provide improved performance, but are difficult to apply to discrete multi-tone (DMT) transmission system applications, which limits their use. Furthermore, decision feedback TDEQ mechanisms can suffer from error propagation problems, wherein the occurrence of one error leads to an increased probability of the occurrence of an error in the subsequent data symbols. As another example, transmission precoding is also used to compensate for known channel effects. However, transmission precoding requires an accurate characterization of the channel and a cooperative transmitter. Furthermore, transmission precoding cannot be implemented in all types of transmission systems. For example, transmission precoding cannot be implemented within the current asynchronous digital subscriber line (ADSL) standards ANSI T1.413 and ITU992.2.

Therefore, based on the need to reduce ISI in digital communications systems and the limitations in the prior approaches, an approach for reducing ISI in digital communications systems, and in particular DSL communications systems, that does not suffer from limitations inherent in conventional ISI removal approaches is highly desirable.

SUMMARY OF THE INVENTION

According to one aspect of the invention, a computer-implemented method is provided for processing data received from a communications channel. First, the data is received from the communications channel, wherein the transmitted data consists of data modulated onto an arbitrary number of carriers. Then, a minimum mean square estimate of the data before the data was transmitted on the communications channel is determined. Finally, the minimum mean square estimate is used to compensate for the distortion introduced into the data by the communications channel and also the external noise sources.

According to another aspect of the invention, a computer-implemented method is provided for equalizing data received from a digital subscriber line, DMT or OFDM based communication system, to remove distortion in the data introduced by transmitting the data along a communications channel, e.g., a digital subscriber line. First, the data is received from the digital subscriber line. Then, a minimum mean square estimate of the data is determined using a Kalman filter. The minimum mean square estimate is used to compensate for the distortion in the data introduced by transmitting the data on the digital subscriber line.

According to another aspect of the invention, a receiver is provided for equalizing analog data received from a communications channel, wherein the analog data includes distortion introduced by transmitting the analog data on the communications channel. The receiver comprises an analog front end (including filtering), an analog-to-digital converter and an equalizer. The analog-to-digital converter is configured to convert the analog data received from the communications channel to digital data. The equalizer is configured to determine a minimum mean square estimate of the analog data received from the communications channel and to use the minimum mean square estimate of the analog data to compensate for distortion introduced into the analog data by transmitting the analog data on the communications channel.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects and features of example embodiments of the invention are described in more detail hereinafter in the following sections: (1) functional overview; (2) time domain equalization; (3) adaptive filtering; (4) frequency domain equalization; and (5) implementation mechanisms.

1. FUNCTIONAL OVERVIEW

A computer-implemented approach for reducing distortion in digital communications systems generally involves equalizing communications channel output data in the time domain to compensate for distortion introduced by the communication channel. According to one embodiment of the invention, a minimum mean square estimation of the original data is obtained using a Kalman filter to compensate for substantially all ISI in the time domain. The use of a Kalman filter with an increased length state provides a smoothing delay with relatively little additional computational cost. Subsequent equalization may also be performed in the frequency domain to correct residual amplitude and phase distortion.

Figure 3:
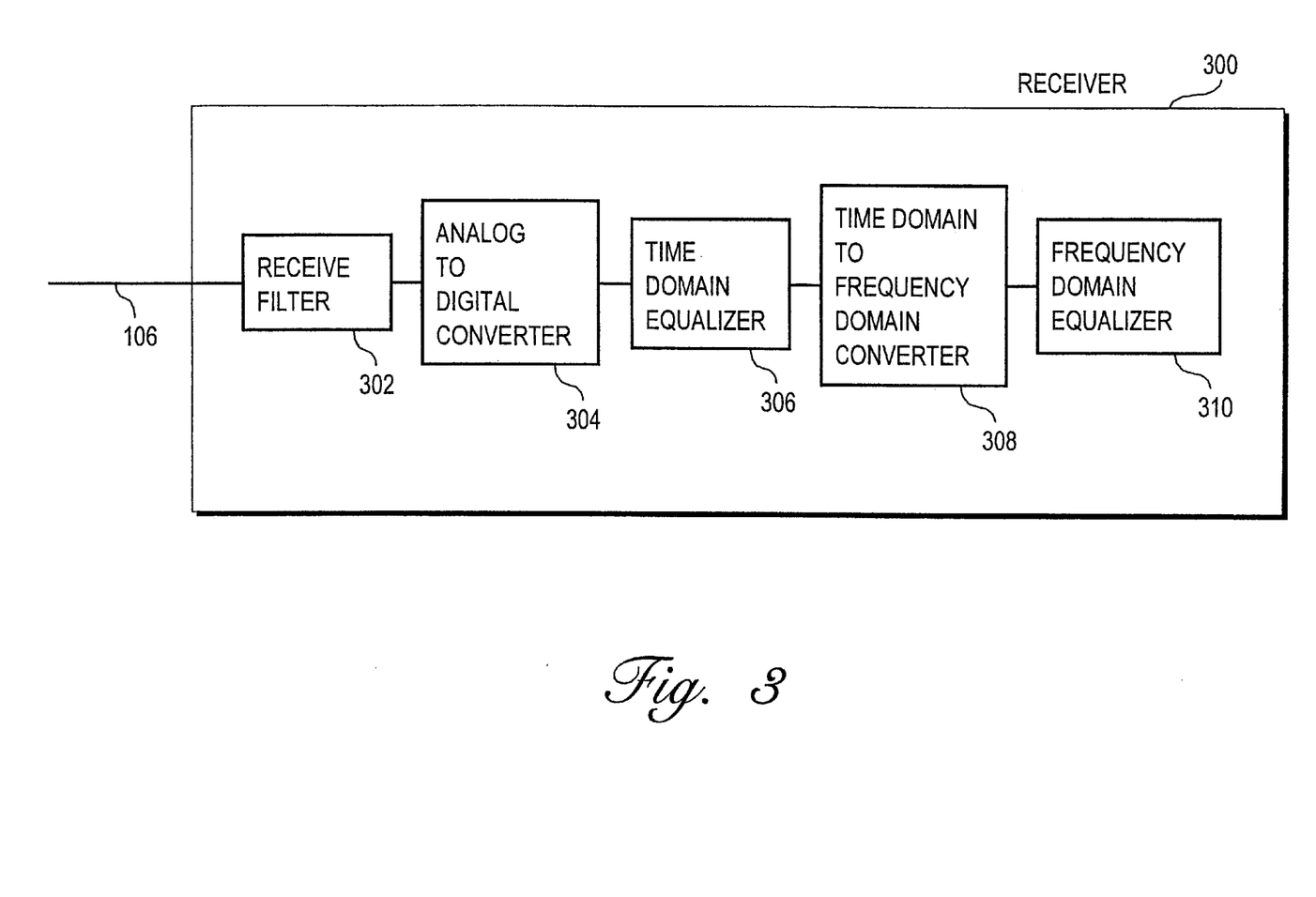
FIG. 3 is a block diagram of a communications system receiver implemented in accordance with an embodiment of the invention.

FIG. 3 is a block diagram that illustrates an example receiver 300 that processes analog encoded data received from communications channel 106 in accordance with an embodiment of the invention. Receiver 300 includes a receive filter 302, an analog-to-digital converter 304, a time domain equalizer 306, a time domain-to-frequency domain converter 308 and a frequency domain equalizer 310. The use of these components to process digital encoded data received from communications channel 106 is now described with reference to a flow diagram 400 of FIG. 4.

Figure 4:
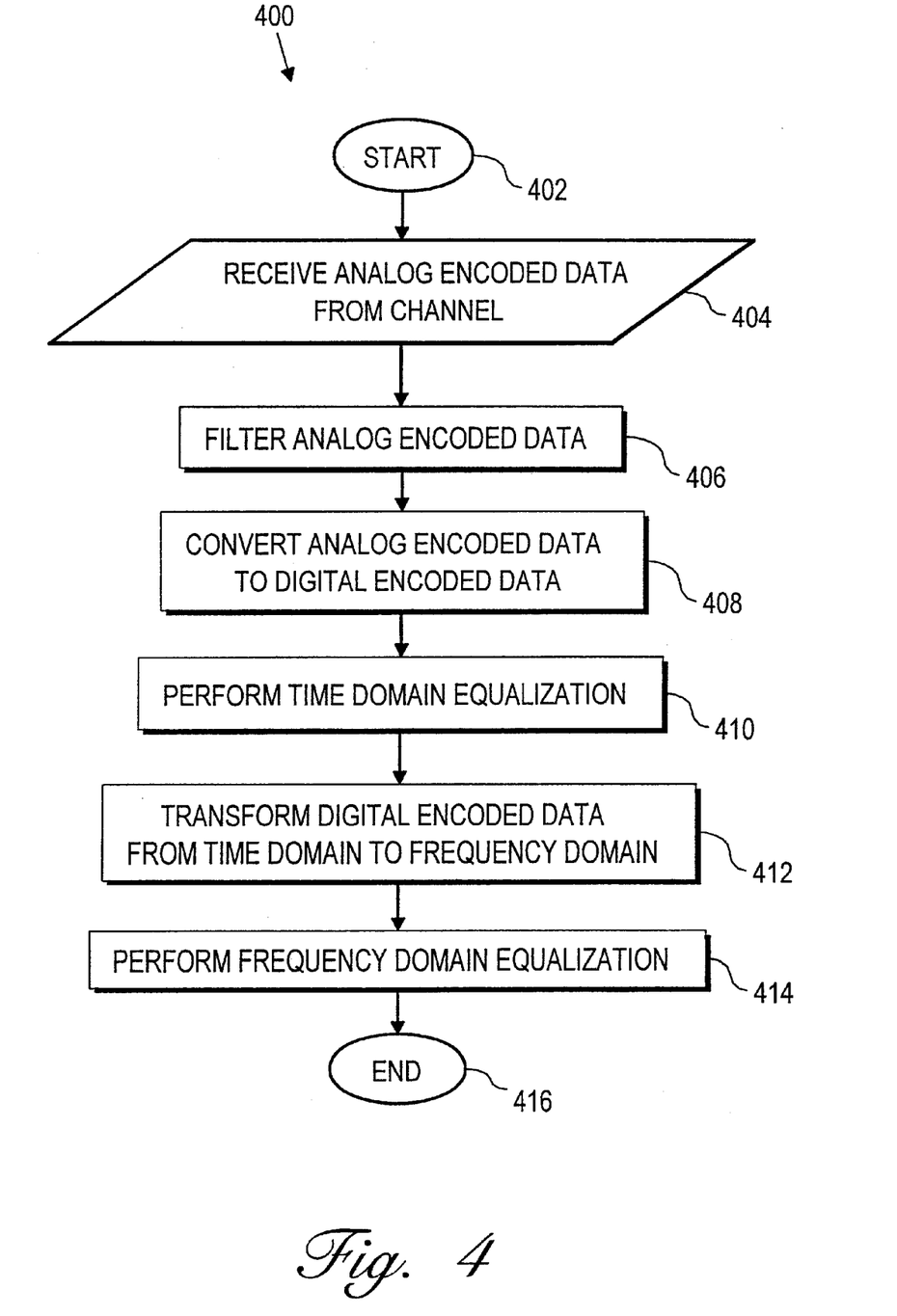
FIG. 4 is a flow diagram illustrating an approach for removing distortion in a communications system according to an embodiment of the invention.

After starting in step 402, in step 404, analog encoded data is received from channel 106.

In step 406, the analog encoded data is filtered by receive filter 302 to remove any undesired components from the received analog encoded data.

In step 408, the analog encoded data is converted to digital encoded data by analog-to-digital converter 304.

In step 410, time domain equalization is performed on the digital encoded data by time domain equalizer 306 to remove substantially all ISI. According to one embodiment of the invention, performing time domain equalization involves determining a minimum mean square estimate (MMSE) of the original data using a Kalman filter to compensate for ISI introduced by channel 106. However, although embodiments of the invention are disclosed herein in the context of determining the MMSE using a Kalman filter, any mechanism may be employed for this purpose and the invention is not limited to any particular mechanism. In general terms, minimum mean square estimation is defined by:

$$E[(x-\hat{x})^2|y]$$

min $\hat{x}$
where:

E is the expected value x is the original data transmitted in the communications channel $\hat{x}$ is the output of the equalizer mechanism

| is the conditional mean on y the output of the communications channel

Additional details and examples of the Kalman filter are described in more detail hereinafter.

In step 412, the digital encoded data received from time domain equalizer 306 is converted to the frequency domain by time domain-to-frequency domain converter 308. Time domain-to-frequency domain converter 308 may incorporate any techniques for converting the data, such as a fast Fourier transform, and the invention is not limited to a particular transformation technique.

In step 414, frequency domain equalization is performed on the digital encoded data by frequency domain equalizer 310 to correct any residual amplitude and phase distortion, as described in more detail hereinafter. The process is complete in step 416. The data is then typically provided to a decoder to recover the original digital data.

2. TIME DOMAIN EQUALIZATION

According to an embodiment of the invention, a Kalman filtering technique with an increased length state, i.e., a smoother, is used to remove substantially all ISI from the received digital encoded data in the time domain by obtaining an MMSE of the original data. Kalman filtering, while never having been applied in nor considered for the context depicted in FIG. 3, is a well known technique for other uses in the field of mathematics. For example, see *"Optimal Filtering,"* by B. D. O Anderson and J. Moore, Englewood Cliffs, N.J. Prentice Hall 1979 ISBN 013631227. Referring to FIG. 2, data transmitted by transmitter 102 may be represented by a discrete time sequence x(k) that is processed by digital-to-analog converter 204 and transmit filter 206. The analog representation of the signal at the output of transmitter 102 is denoted by x(t). Channel 106 is characterized by its impulse response h(t). The output of channel 106, y(t), is then $$y(t)=h(t)*x(t)+n(t) \quad (1)$$

where x(t) is the channel input and n(t) accounts for all channel disturbances such as additive white Gaussian noise, crosstalk and echo noise. At receiver 104, the channel output y(k) is sampled to produce a discrete time received signal y(k). Thus, according to an embodiment of the invention, the goal is to obtain a discrete time estimate $\hat{x}(k)$ of the original discrete time signal x(k).

It has been determined, in accordance with an embodiment of the invention, that the transmitted data sequence x(k) can be approximated by a white Gaussian sequence. This is due to the use of the inverse fast Fourier transform (IFFT) to generate the data samples and the fact that the symbols input to the IFFT are random in amplitude and phase and independent of each other. The approximate Gaussian nature of the data sequence is deduced from application of the central limit theorem. Consequently, the white Gaussian assumption is best when the quadrature amplitude modulation (QAM) constellation size is large and the number of communications sub-channels is large. Any channel can be represented as an Auto Regressive Moving Average (ARMA) model by appropriate choice of the ARMA parameters to yield the actual channel impulse response. The channel output is well approximated by a white Gaussian input sequence driving an ARMA process, for which the Kalman filter yields the optimal estimate of the input sequence in the MMSE sense.

The identified channel is represented by an ARMA model given by $$\hat{H}(z) = \frac{\hat{b}(z)}{\hat{a}(z)} \quad (2)$$

$$\hat{H}(z) = \frac{\hat{b}_0 + \hat{b}_1 z^{-1} + \hat{b}_2 z^{-2} \ldots + \hat{b}_m z^{-m}}{1 + \hat{a}_1 z^{-1} + \hat{a}_2 z^{-2} + \ldots + \hat{a}_m z^{-m}} \quad (3)$$

where $\hat{a}_0=1$ by definition and $\hat{H}(z)$ has impulse response $\hat{h}(k)$, as an estimate of the sampled channel impulse response h(k). The channel identifier may use the equalizer output to estimate the channel response adaptively.

Kalman filter based equalization is implemented as follows according to one embodiment of the invention. First, a state ξ(k) is defined to be a function of the data input and the denominator of the identified channel. Then the channel output is defined to be a function of the intermediate state ξ(k) and the numerator of the identified channel. These state and observation equations are given by:

$$\xi(k+1)=\hat{A}\xi(k)+Gx(k) \quad (4)$$

$$y(k)=\hat{B}\xi(k)+n(k) \quad (5)$$

where $\hat{A}$ and $\hat{B}$ are derived from the identified channel parameters $\hat{a}(z)$ and $\hat{b}(z)$ $$\hat{A} = \begin{bmatrix} -\hat{a}_1 & -\hat{a}_2 & -\hat{a}_3 & \cdots & -\hat{a}_m & 0 & \cdots & 0 \\ 1 & 0 & 0 & \cdots & 0 & 0 & \cdots & 0 \\ 0 & 1 & 0 & \cdots & & 0 & \cdots & 0 \\ \vdots & & & \ddots & & & & \vdots \\ 0 & & & \cdots & & 0 & 1 & 0 \end{bmatrix} \quad (6)$$

and are given by:

$$\hat{B}=[\hat{b}_0 \ \hat{b}_1 \ldots \hat{b}_m \ 0 \ldots 0] \quad (7)$$

It is assumed that $\hat{a}(z)$ and $\hat{b}(z)$ are of the same order m. If necessary, this can be achieved by padding the vector $\hat{a}$ or $\hat{b}$ with an appropriate number of zeros. In order to achieve a delay of "L" samples before the output is taken, the first row of $\hat{A}$ has "L+1" zeros after the $\hat{a}_i$ elements. The remaining rows of $\hat{A}$ then consist of the "(L+m)×(L+m)" identify matrix and a column of zeros. Therefore, $\hat{A}$ is a "(L+m+1)×(L+m+1)" square matrix. Similarly, the $\hat{B}$ matrix is extended with "L" zeros to form a "1×(L+m+1)" matrix.

Figure 5:
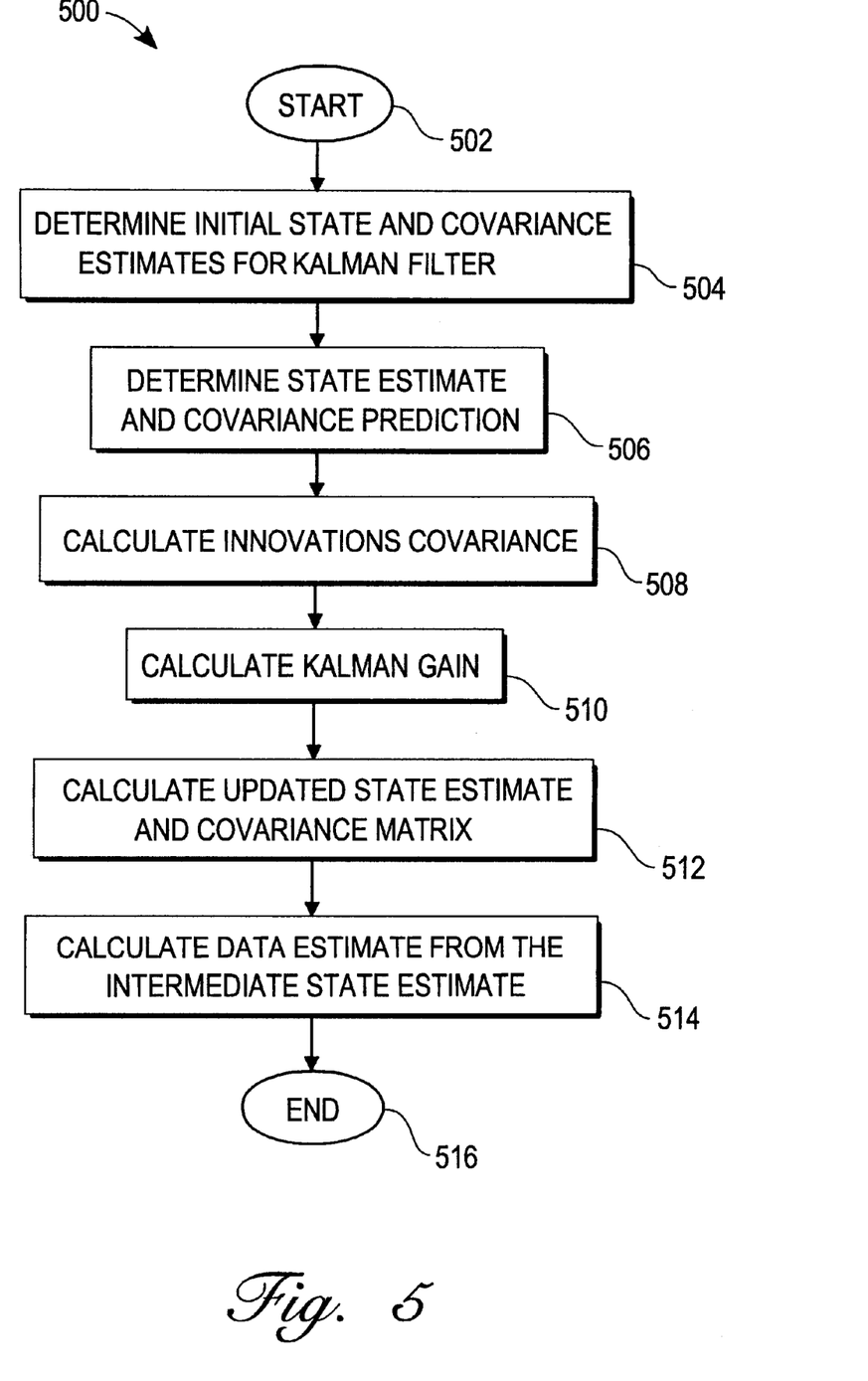
FIG. 5 is a flow diagram illustrating an approach for determining an optimal estimate of a single input sample of a data input sequence using a Kalman filter with an increased length state according to an embodiment of the invention.

FIG. 5 is a flow diagram 500 illustrating an approach for determining an optimal estimate $\hat{x}(k)$ of a single input sample of the data input sequence x(k) using a Kalman filter with an increased length state according to an embodiment of the invention. The process is repeated for each successive input sample. After starting in step 502, in step 504, the initial state and covariance estimates for the Kalman filter are set to:

$$\hat{\xi}(0|0) = \begin{bmatrix} 0 \\ 0 \\ \vdots \\ 0 \end{bmatrix} \quad (8)$$

$$P(0|0)=I \quad (9)$$

To maintain consistency with the definitions of $\hat{A}$ and $\hat{B}$, ξ(.|.) has dimension "(L+m+1)×1", and P(.|.) has dimension "(L+m+1)×(L+m+1)". The initialization P(0|0) reflects the assumption that the input data is a zero mean unit variance white Gaussian sequence. If the input data is not a zero mean unit variance white Gaussian sequence, then the initialization is modified accordingly i.e $\xi=\xi_{mean}$ and $P(0|0)=P_0$. In step 506, the state estimate and covariance predictions are determined as follows:

$$\xi(k|k-1)=\hat{A}\hat{\xi}(k-1|k-1) \quad (10)$$

$$P(k|k-1)=\hat{A}P(k-1|k-1)\hat{A}'+GQG' \quad (11)$$

where Q is the covariance of the data input x(k), which in this example is a scalar.

In step 508, the innovations covariance is determined based upon the difference between the actual observation of the data and the data predicted from the state prediction.

According to one embodiment of the invention, the innovations covariance is determined as follows:

$$S(k) = \hat{B} P(k|k-1) \hat{B}' + R \quad (12)$$

In step 510, the Kalman gain is calculated as follows:

$$K(k) = P(k|k-1) \hat{B}' S(k)^{-1} \quad (13)$$

In step 512, the updated state estimate and covariance matrix are calculated as follows:

$$\hat{\xi}(k|k) = \hat{\xi}(k|k-1) + K(k)(y(k) - \hat{B}\hat{\xi}(k|k-1)) \quad (14)$$

$$P(k|k) = P(k|k-1) - K(k) S(k) K(k)' \quad (15)$$

While this is the simplest form of the covariance update, it may suffer from numerical instability. In practice, a numerically stable form of the update is used i.e. $P(k|k) = [I - K(k) \hat{B}(k)] P(k|k-1) [I - K(k) \hat{B}(k)] + K(k) R(K) K'(k)$. For further details refer to "*Stochastic Models, Estimation, and Control,*" P. S. Maybeck, Academic Press, Vol. 1, 1979.

In step 514 the data estimate is calculated from the intermediate state estimate as follows:

$$\hat{x}(k-1|k) = \tilde{a} \hat{\xi}(k|k) \quad (16)$$

where $$\tilde{a} = [0 \ldots 0 \ 1 \ \hat{a}_1 \ldots \hat{a}_m] \quad (17)$$

consists of $\hat{a}$ with "L" leading zeros to achieve the "L" sample delay to "smooth" the data.

The process is complete in step 516.

The data estimate $\hat{x}(k-L|k)$ is the MMSE estimate of the data input $x(k-L)$ given received data up to time k and is the optimal estimate of the input data. If the channel characteristics do not change over time, then the filter gain and covariance converge to steady state values. In this situation, the Kalman filter becomes equivalent to a linear transverse filter.

3. ADAPTIVE FILTERING

In some situations, the characteristics of the channel change over time. For example, changes in ambient conditions or channel configuration can cause the channel characteristics to change. Therefore, according to an embodiment of the invention, adaptive Kalman filtering is employed to account for changes in channel characteristics. Specifically, in situations where channel characteristics are changing over time, the updated channel parameter estimates denoted by $\hat{A}(K)$ and $\hat{B}(k)$ are used instead of the fixed matrices $\hat{A}$ and $\hat{B}$. Furthermore, the Kalman filter yields the optimal gain $K(k)$ that ensures the estimate $\hat{x}(k-L|k)$ is optimal.

4. FREQUENCY DOMAIN EQUALIZATION

In some situations, Kalman filter equalization may not provide exact equalization at all frequencies. Therefore, according to one embodiment of the invention, residual amplitude and phase distortion are corrected in the frequency domain. According to one embodiment of the invention, frequency domain equalization involves first determining the frequency response of the Kalman filter and then determining the required frequency domain equalization. Another embodiment would involve averaging a sequence of training data in the frequency domain to establish the gain dilation and phase rotation required for each QAM constellation in every tone and then applying this transformation to each constellation to the receive and transformed data transmission.

a. Determining the Frequency Response of the Kalman Filter

The first step in compensating for residual gain and distortion in the frequency domain is to determine the frequency response of the Kalman filter in the steady state. First, the steady state Kalman gain $K_{ss}$ is calculated, either by iteration or by solution of the Ricatti equation. Next, the transfer function of the Kalman filter equalizer in the z domain is calculated as follows:

$$H_{eq}(z) = \tilde{a}[(I - z^{-1})\hat{A} + z^{-1} K_{ss} \hat{B} \hat{A}]^{-1} K_{ss} \quad (18)$$

Then the magnitude and phase of the frequency response at any desired frequency $f$ is calculated by substituting $z = e^{j2\pi f}$ in equation (18). The resultant complex valued transfer function is denoted $H_{eq}(f)$.

b. Determining Frequency Domain Equalization

To determine the required frequency domain equalization, the overall transfer function from transmitted data sequence to time domain equalizer output is calculated by:

$$H_{total}(z) = H(z) H_{eq}(z) \quad (19)$$

Note that in situations where all ISI has been removed during time domain equalization, $H_{total}(f)$ is unity at all frequencies. The complex output of time domain to frequency domain converter 308 is denoted by $X_r(f)$. The frequency domain equalized output is then given by:

$$X_{FDEQ}(f) = \frac{X_r(f)}{H_{total}(f)} \quad (20)$$

Where $H_{total}(f)$ is obtained by substituting $z = e^{j2\pi f}$ in equation (19) at the discrete set of frequencies corresponding to the frequency bins of the mechanism employed in time domain to frequency domain converter 308. $X_{FDEQ}(f)$ represents the recovered QAM symbols that are then passed to decoder 214.

5. IMPLEMENTATION MECHANISMS

The approach for removing distortion in communications systems is applicable to any type of communications systems and is particularly well suited for broadband digital communications systems including wireless systems, cable modem systems, DSL applications and in particular, ADSL applications. Furthermore, the approach may be implemented as part of a receiver or a communications system, or as a stand-alone equalizer mechanism. The invention may be implemented in hardware circuitry, in computer software, or a combination of hardware circuitry and computer software and is not limited to a particular hardware or software implementation.

Figure 6:
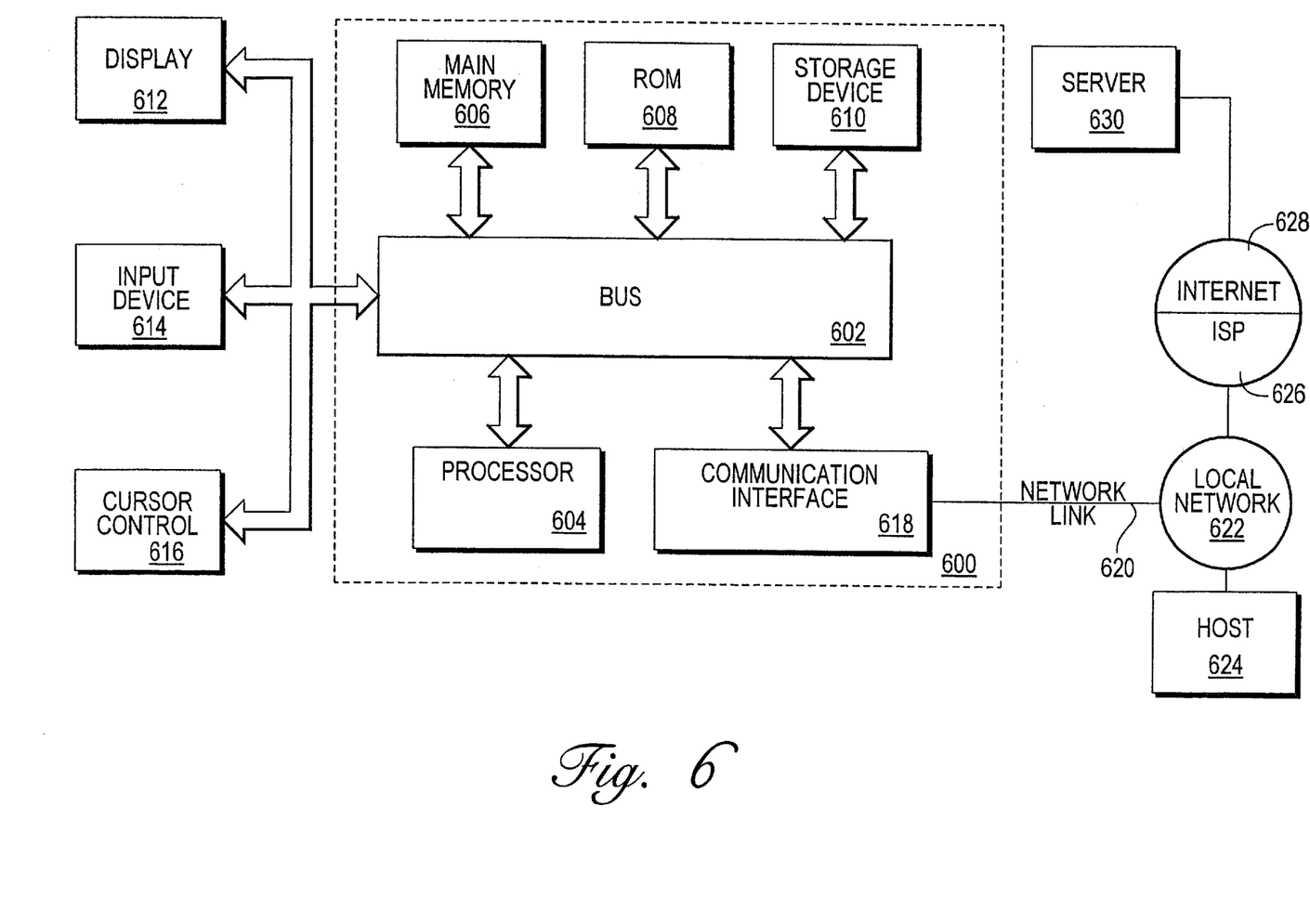
FIG. 6 is a block diagram of a computer system upon which embodiments of the invention may be implemented.

FIG. 6 is a block diagram that illustrates a computer system 600 upon which an embodiment of the invention may be implemented at least in part in computer software. Computer system 600 includes a bus 602 or other mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for removing distortion in digital communications systems. According to one embodiment of the invention, the removal of distortion in digital communications systems is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communications interface 618 coupled to bus 602. Communications interface 618 provides a two-way data communications coupling to a network link 620 that is connected to a local network 622. For example, communications interface 618 may be an integrated services digital network (ISDN) card or a modem to provide a data communications connection to a corresponding type of telephone line. As another example, communications interface 618 may be a local area network (LAN) card to provide a data communications connection to a compatible LAN. Wireless links may also be implemented. In any such implementation, communications interface 618 sends and receives electrical, electromagnetic or optical signals that carry digital data streams representing various types of information.

Network link 620 typically provides data communications through one or more networks to other data devices. For example, network link 620 may provide a connection through local network 622 to a host computer 624 or to data equipment operated by an Internet Service Provider (ISP) 626. ISP 626 in turn provides data communications services through the world wide packet data communications network now commonly referred to as the "Internet" 628. Local network 622 and Internet 628 both use electrical, electromagnetic or optical signals that carry digital data streams. The signals through the various networks and the signals on network link 620 and through communications interface 618, which carry the digital data to and from computer system 600, are exemplary forms of carrier waves transporting the information.

Computer system 600 can send messages and receive data, including program code, through the network(s), network link 620 and communications interface 618. In the Internet example, a server 630 might transmit a requested code for an application program through Internet 628, ISP 626, local network 622 and communications interface 618. In accordance with the invention, one such downloaded application provides for the removal of distortion in digital communications systems as described herein.

The received code may be executed by processor 604 as it is received, and/or stored in storage device 610, or other non-volatile storage for later execution. In this manner, computer system 600 may obtain application code in the form of a carrier wave.

The novel approach described herein for reducing distortion in digital communications systems provides several advantages over prior approaches. A significant advantage is that elimination of substantially all ISI in the time domain allows data rates to approach the theoretical capacity of the communications channel, as defined by Shannon's theorem. Another advantage is that the approach can be implemented to operate on the received encoded data without requiring any changes to the transmission mechanism. The approach also provides inherent stability with no error propagation. Finally, the approach is applicable to DSL protocols and in particular, the ADSL and VDSL protocol. Thus the approach is compatible with ADSL/VDSL, DMT and OFDM transmitters without requiring changes to the ADSL/VDSL, DMT and OFDM transmitters.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for processing data received from a digital subscriber line, the method comprising the computer-implemented steps of:

receiving the data from the digital subscriber line, wherein the data is modulated onto one or more carriers and includes distortion introduced by the digital subscriber line;

determining a minimum mean square estimate of the data before the data was transmitted on the digital subscriber line; and using the minimum mean square estimate to compensate for the distortion introduced into the data by the digital subscriber line.

2. The method as recited in claim 1, wherein determining a minimum mean square estimate of the data before the data was transmitted on the digital subscriber line includes processing the data using a Kalman filter.

3. The method as recited in claim 2, wherein processing the data using a Kalman filter includes processing the data using a Kalman filter with an increased length state.

4. The method as recited in claim 1, further comprising after using the minimum mean square estimate to compensate for the distortion introduced by the digital subscriber line, transforming the data from the time domain to a frequency domain to generate frequency domain data, and removing residual amplitude and phase distortion from the frequency domain data in the frequency domain.

5. The method as recited in claim 3, wherein determining a minimum mean square estimate of the data before the data was transmitted on the digital subscriber line using a Kalman filter with an increased length state includes:

determining initial state and covariance estimates for the Kalman filter, determining state estimate and covariance predictions, determining an innovations covariance, determining a Kalman gain for the Kalman filter, determining an updated state estimate and covariance matrix, and determining a data estimate based upon the updated state estimate.

6. The method as recited in claim 4, wherein removing residual amplitude and phase distortion from the frequency domain data in the frequency domain includes averaging a sequence of training data in the frequency domain to establish a gain dilation and phase rotation required for each QAM constellation in every tone and then applying the transformation to each constellation in the received and transformed data transmission.

7. The method as recited in claim 4, wherein removing residual amplitude and phase distortion from the frequency domain data in the frequency domain includes determining a frequency response of the Kalman filter, and determining a transfer function from the data before the data was transmitted on the digital subscriber line to the data received from the digital subscriber line.

8. A method for processing data in a Multicarrier communications system, the method comprising the computer-implemented steps of:

receiving data from a digital subscriber line, wherein the data is modulated onto one or more carriers and includes distortion introduced by the digital subscriber line;

determining a minimum mean square estimate of the data before the data was transmitted on the digital subscriber line; and using the minimum mean square estimate to compensate for the distortion introduced into the data by the digital subscriber line.

9. A receiver for equalizing analog data received from a communications channel, wherein the analog data includes distortion introduced by transmitting the data on the communications channel, the receiver comprising:

one or more receive filters;

one or more amplifiers;

an analog-to-digital converter configured to convert the analog data received from the communications channel to digital data; and an equalizer configured to determine, using a Kalman filter, a minimum mean square estimate of the data received from the communications channel and to use the minimum mean square estimate to remove the distortion introduced by transmitting the analog data on the communications channel.

10. The receiver as recited in claim 9, wherein the Kalman filter is a Kalman filter with an increased length state.

11. The receiver as recited in claim 9, wherein the communications channel is a digital subscriber line and the analog-to-digital converter is configured to receive and convert the analog data from the digital subscriber line to digital data.

12. The receiver as recited in claim 9, wherein the equalizer is further configured to determine initial state and covariance estimates for the Kalman filter, determine a state estimate and covariance predictions, determine an innovations covariance, determine a Kalman gain for the Kalman filter, determine an updated state estimate and covariance matrix, and determine a data estimate based upon the updated state estimate.

13. A computer-readable medium for processing data received from a digital subscriber line, the computer-readable medium carrying one or more sequences of one or more instructions which, when executed by one or more processors, cause the one or more processors to perform the steps of:

receiving the data from the digital subscriber line, wherein the transmitted data is modulated onto one or more carriers and includes distortion introduced by the digital subscriber line;

determining a minimum mean square estimate of the data before the data was transmitted on the digital subscriber line; and using the minimum mean square estimate to compensate for the distortion introduced into the data by the digital subscriber line.

14. The computer-readable medium as recited in claim 13, wherein determining a minimum mean square estimate of the data before the data was transmitted on the digital subscriber line includes processing the data using a Kalman filter.

15. The computer-readable medium as recited in claim 14, wherein processing the data using a Kalman filter includes processing the data using a Kalman filter with an increased length state.

16. The computer-readable medium as recited in claim 13, further comprising instructions which, when executed by the one or more processors, cause the one or more processors to, after using the minimum mean square estimate to compensate for the distortion introduced by the digital subscriber line,     transform the data from the time domain to a frequency domain to generate frequency domain data, and     remove residual amplitude and phase distortion from the frequency domain data in the frequency domain.

17. The computer-readable medium as recited in claim 15, wherein processing the data using a Kalman filter with an increased length state includes:

determining initial state and covariance estimates for the Kalman filter,     determining state estimate and covariance predictions,     determining an innovations covariance,     determining a Kalman gain for the Kalman filter,     determining an updated state estimate and covariance matrix, and     determining a data estimate based upon the updated state estimate.

18. The computer-readable medium as recited in claim 16, wherein removing residual amplitude and phase distortion from the frequency domain data in the frequency domain includes averaging a sequence of training data in the frequency domain to establish a gain dilation and phase rotation required for each QAM constellation in every tone and then applying the transformation to each constellation in the received and transformed data transmission.

19. The computer-readable medium as recited in claim 16, wherein removing residual amplitude and phase distortion from the frequency domain data in the frequency domain includes     determining a frequency response of a Kalman filter used to determine the minimum mean square estimate, and     determining a transfer function from the data before the data was transmitted on the digital subscriber line to the data received from the digital subscriber line.

20. The receiver as recited in claim 16, wherein the receiver is configured to transform the data from the time domain to a frequency domain to generate frequency domain data, and     remove residual amplitude and phase distortion from the frequency domain data in the frequency domain.

21. The receiver as recited in claim 20, wherein the receiver is further configured to remove residual amplitude and phase distortion from the frequency domain data in the frequency domain by averaging a sequence of training data in the frequency domain to establish a gain dilation and phase rotation required for each QAM constellation in every tone and then applying the transformation to each constellation in the received and transformed data transmission.

22. The receiver as recited in claim 20, wherein the receiver is further configured to remove residual amplitude and phase distortion from the frequency domain data in the frequency domain by     determining a frequency response of a Kalman filter used to determine the minimum mean square estimate, and     determining a transfer function from the data before the data was transmitted on the digital subscriber line to the data received from the digital subscriber line.

23. A computer-readable medium for processing data in a Multicarrier communications system, the computer-readable medium carrying one or more sequences of one or more instructions which, when executed by one or more processors, cause the one or more processors to perform the steps of:

receiving data from a digital subscriber line, wherein the data is modulated onto one or more carriers and includes distortion introduced by the digital subscriber line;

determining a minimum mean square estimate of the data before the data was transmitted on the digital subscriber line; and     using the minimum mean square estimate to compensate for the distortion introduced into the data by the digital subscriber line.

\* \* \* \* \*